United States Patent

[11] 3,583,579

| [72] | Inventors | Henry Francis Triggs;<br>Frankbert Lawton, both of St. Albans England |
|---|---|---|
| [21] | Appl. No. | 789,500 |
| [22] | Filed | Jan. 7, 1969 |
| [45] | Patented | June 8, 1971 |
| [73] | Assignee | Remalo Engineering Company Limited, Albans, Hertfordshire, England |
| [32] | Priority | Feb. 6, 1968 |
| [33] | | Great Britain |
| [31] | | 5886/68 |

[54] APPARATUS FOR STACKING AND/OR DESTACKING ARTICLES
2 Claims, 4 Drawing Figs.

[52] U.S. Cl. .................................................. 214/6, 214/8.5; 306
[51] Int. Cl. .................................................. B65g 60/00
[50] Field of Search .................................. 214/6.2, 60, 306, 8.5, 8.5 A, 8.5 K

[56] References Cited
UNITED STATES PATENTS

| 2,934,221 | 4/1960 | Tonna | 214/6 |
|---|---|---|---|
| 2,978,125 | 4/1961 | Freeman | 214/6X |
| 3,039,625 | 6/1962 | Bruce | 214/6 |
| 3,053,402 | 9/1962 | Russell et al. | 214/6 |
| 3,171,550 | 3/1965 | Gaidostik et al. | 214/6 |
| 3,181,712 | 5/1965 | Von Gal, Jr. | 214/6 |
| 3,325,021 | 6/1967 | Burns et al. | 214/6 |
| 3,342,350 | 9/1967 | Seragnoli | 214/6X |
| 3,360,100 | 12/1967 | Seragnoli | 214/6X |
| 3,421,638 | 1/1969 | Locke et al. | 214/6 |
| 3,458,058 | 7/1969 | Faerber | 214/6 |

FOREIGN PATENTS

| 1,061,861 | 3/1967 | Great Britain | 214/6.2 |

*Primary Examiner*—Gerald M. Forlenza
*Assistant Examiner*—Robert J. Spar
*Attorney*—Holman, Glascock, Downing and Seebold ABSTRACT: Apparatus for stacking and/or destacking articles of the type indicated, which includes means for lifting an article, and any articles supported upon it, to a height greater than that of the article, and means, operative upon subsequent lowering of the lifting means, for supporting all the lifted articles, or all of them except the lowermost one, at a height above lowered position of the lifting means which is greater than the height of one article.

PATENTED JUN 8 1971

3,583,579

INVENTORS
HENRY FRANCIS TRIGGS
FRANK BERT LAWTON

BY Holman, Glascock,
Downing & Seebold
ATTORNEYS

APPARATUS FOR STACKING AND/OR DESTACKING ARTICLES

This invention relates to apparatus for stacking and/or destacking containers or carriers of the type which, whether they are loaded or not, can be stacked one upon another with a predetermined spacing between adjacent containers or carriers in the stack, each one engaging and supporting the container or carrier next above it in the stack. Such containers or carriers may be pallets, trays, boxes or like supporting members, such as stillages or lipped tote bins.

The present invention consists in apparatus for stacking and/or destacking articles of the type indicated, which includes means for lifting an article, and any articles supported upon it, to a height greater than that of the article, and means, operative upon subsequent lowering of the lifting means, for supporting all the lifted articles, or all of them except the lowermost one, at a height above the lowered position of the lifting means which is greater than the height of one article.

Figures 1, 2:
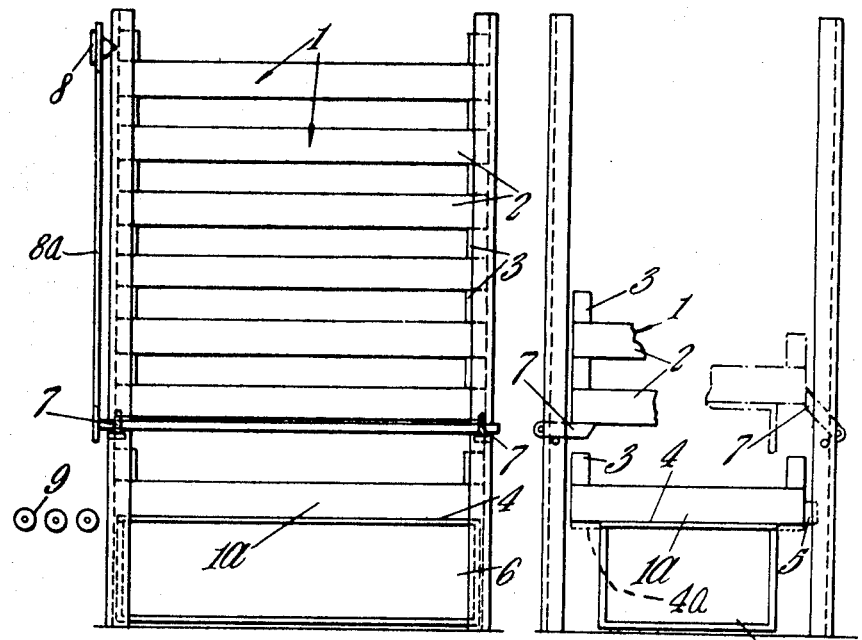
FIG. 1 is a diagrammatic side view of apparatus according to the present invention.
FIG. 2 is an end view of the apparatus of FIG. 1.

In carrying the invention into effect according to one convenient mode by way of example, FIGS. 1 and 2 show apparatus for stacking trays 1 of the type consisting of a tray portion 2 having upwardly extending supports 3 which engage and support the underneath of the tray portion of the pallet next above.

For stacking, trays (with or without goods carried in their tray portions) are conveyed by any suitable transport, such as a truck or trolley, and are fed manually one by one to the loading position, indicated by tray 1a, in which the tray rests upon a lifting platform 4.

When the tray reaches this position it operates a switch 5 which actuates lifting means 6 which may be of hydraulic or other suitable form to raise the tray and any others which may be supported upon it through a distance greater than the effective height of one tray (say 1½ times its height) which will cause pawls 7 to be moved upwardly by the sides of the pallet (as shown on the right-hand side of FIG. 2) until such time as the tray is clear of the pawls which will then fall back into a position beneath this tray, i.e. between the tray and the platform.

The platform 4 is then lowered, but the tray, and any other supported upon it, will remain supported by the pawls (as shown on the left-hand side of FIG. 2) at a height which allows sufficient clearance for a subsequent tray to be fed to the loading position on the platform 4.

This sequence of events is repeated a number of times to form a stack of trays with the lowermost trays resting upon the pawls 7.

Suitable detector means 8 are positioned at a predetermined height so that when the stack contains a desired number of trays by the addition to the stack of the last lowermost tray upon the upward movement of the lifting platform, then upon the next succeeding downward movement of the platform the pawls 7 are rendered inoperative (for example by being held in a vertical position by means of mechanical linkage 8a), so that the entire stack can be lowered with the platform 4 to its lowered position.

The stack may then be removed upon a conveyor 9, or other device, the detector means detecting removal of the stack and thereupon resetting the pawls to their normal operative position so that formation of a subsequent stack may begin. In this way a series of trays fed one by one the same height may be readily converted into a stack consisting of a predetermined number of trays for subsequent handling as a stack.

With slight modification, the apparatus of FIGS. 1 and 2, may be used for destacking. All that is necessary is to ensure that the pawls 7 cannot support the lowermost tray of the stack. A stack of trays is fed onto the platform 4 for example by means of conveyor 9, the pawls 7 being temporarily raised for example manually to permit entry of the stack and the detector means 8 being rendered inoperative.

Suitable means are provided for preventing the pawls from engaging the underneath of the lowermost tray of the stack. For example, the width of the platform 4 may be effectively increased and made the same as that of the trays, as shown at 4a in FIG. 2, so that the pawls 7 cannot fall between the lowermost tray and the platform with the result that when the platform and the whole stack on it is raised and lowered, the stack, apart from the lowermost tray, will be left supported upon the pawls 7, but the lowermost tray will descend with the platform for subsequent removal when clear of the remaining stack of trays above it. In this way the trays may be taken one by one from the bottom of the stack.

It will be appreciated that one of the main advantages of the apparatus described above is that stacks of any suitable size may be loaded and unloaded using only a short lifting stroke, say 1½ times the height of one tray, whereas stacking and destacking from the top in conventional manner requires a working stroke of up to the height of the stack. By using cantilevered lifting platforms, the placing of a stack upon or removing it from the stack may be performed using a conventional pallet track.

In an alternative arrangement, which is particularly applicable to "live storage" systems, additional pawl mechanisms may be provided at higher levels for the purpose of discharging the pallets from the stack at these levels. Sensing apparatus, such as photoelectric cells, may be provided to permit selection of a particular discharge level, even for individual pallets. Moreover, if desired pawl mechanisms may be provided to permit removal of a pallet from an intermediate position in a stack, in a manner similar to that previously described with reference to conveyor 9.

It will be appreciated that the apparatus described may be used for stacking articles, such as boxes where there is no gap between adjacent articles, but for destacking such articles special means must be provided for supporting the stack by means of the lowermost article but one to free the lowermost article.

Figure 3:
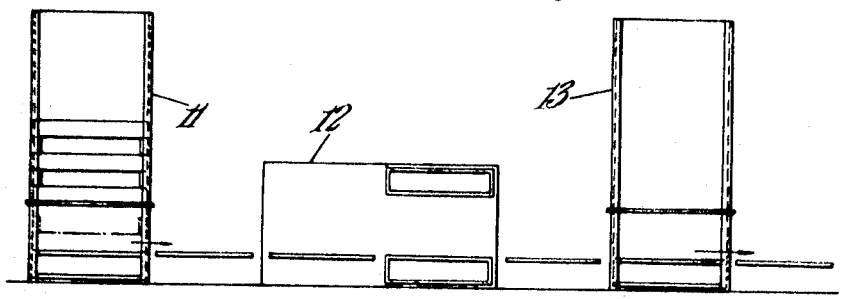
FIG. 3 is a diagrammatic side view of an alternative form of apparatus according to the present invention.

FIG. 3 shows an article handling system which includes a destacking unit, a filling station 12, and a stacking unit.

The unit 11 is constructed in the manner previously described so as to be capable of receiving a stack of empty trays and destacking them one by one from the bottom and feeding them to the filling station 12 whereat the trays are filled.

After filling, the trays are fed one by one to the unit 13 which stacks the trays until the correct height is reached, the stack then being lowered and removed for example by a suitable conveyor.

With this arrangement, stacks of empty trays may be fed to the system and stacks of filled trays removed from it.

Figure 4:
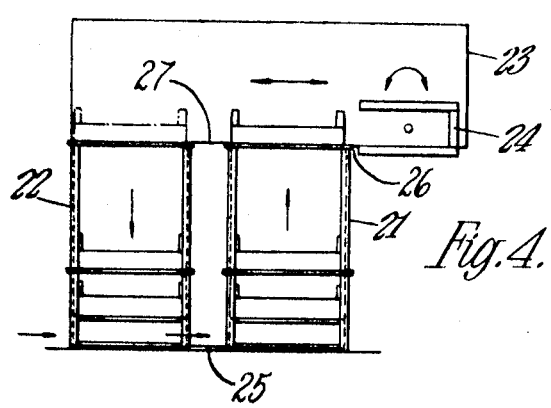
FIG. 4 is a similar view of a further form of apparatus according to the present invention.

The converse sequence of operations may be obtained by using the system shown in FIG. 4 which includes a stacking unit 21, a destacking unit 22 and an unloading station 23.

In this arrangement, a stack of filled trays is initially fed to unit 22 which destacks them and feeds them, one by one by means of a driven conveyor 25 to the unit 21 until they have been restacked. A second stack of filled trays is then fed to the now empty unit 22.

Thereafter, each time a tray is fed from the bottom of the stack in unit 22 to the bottom of the stack in unit 21, one filled tray is fed by means of a driven conveyor 26 from the top of the stack in unit 21 to a tipping station 24 whereat the tray is inverted to discharge its contents, the empty trays being then fed by means of a driven conveyor 27 to the top of the stack in unit 22. The respective lifting means of the units 21 and 22 and the conveyors 25, 26 and 27 operate in synchronism.

When this has been repeated a number of times equal to the number of trays in a stack, the unit 22 will contain a stack of trays all of which have been emptied. This stack is then removed and replaced by a further stack of filled trays for emptying. In this way stacks of filled trays may be delivered to the system and stacks of empty trays removed from it.

It will be remembered that when describing the apparatus of FIGS. 1 and 2 operating as a stacker, attention was drawn to the use of detector means (8, FIG. 1) to override the normal stacking action of the pawls to permit the entire stack to be lowered for removal from the platform.

It will be appreciated that some such overriding mechanism is required for the stacking unit 13 of FIG. 3 to permit the removal of a complete stack of filled trays, but not for the stacking unit 21 of FIG. 4 since here the trays are removed singly from the top of the stack.

In similar fashion, suitable means must be provided for overriding the normal one-by-one destacking action unit 22 when this unit has accumulated a complete stack of empty trays which must be removed and replaced by a stack of filled trays. In this case, since the height of the stack in unit 22 is constant, normally being part filled trays and part emptied trays, a pinwheel device may be used which is advanced for each tray transfer and which by means of cam causes withdrawal of the pawls after a number of transfers, equal to the number of trays in a stack, have been completed. Such a pinwheel device may also be used in place of the detector means 8 in FIG. 1.

We claim:
1. Apparatus for handling articles comprising destacking apparatus which includes lifting means for lifting a stack of articles, by engagement with the lowermost articles of the stack, to a height greater than that of each of the articles, and means, operative upon subsequent lowering of the lifting means, for supporting all the lifted articles except the lowermost article at a height above the lowered position of the lifting means which is greater than the height of one article, stacking apparatus for receiving each lowermost article in turn from the destacking apparatus, which stacking apparatus includes further lifting means for lifting a further stack of articles by engagement with the lowermost article of the further stack to a height greater than that of each of the articles and means, operative upon subsequent lowering of the further lifting means for supporting all the lifted articles at a height above the lowered position of the further lifting means which is greater than the height of one article, means being provided for receiving filled articles one by one from the top of the stacking apparatus, emptying the articles, and feeding them to the top of the destacking apparatus.

2. Apparatus according to claim 1, wherein said receiving, emptying and feeding means includes means for inverting each filled article to discharge its contents.